United States Patent
Hilemon et al.

(10) Patent No.: US 10,248,114 B2
(45) Date of Patent: Apr. 2, 2019

(54) PLANT PROCESS MANAGEMENT SYSTEM WITH NORMALIZED ASSET HEALTH

(71) Applicant: Computational Systems, Inc., Knoxville, TN (US)

(72) Inventors: Christopher G. Hilemon, Knoxville, TN (US); Anthony J. Hayzen, Knoxville, TN (US); Mark Slemp, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 352 days.

(21) Appl. No.: 15/227,070

(22) Filed: Aug. 3, 2016

(65) Prior Publication Data

US 2017/0102695 A1 Apr. 13, 2017

Related U.S. Application Data (60) Provisional application No. 62/239,972, filed on Oct. 11, 2015.

(51) Int. Cl.
*G05B 23/02* (2006.01)
*G06F 17/30* (2006.01)
*G06F 16/2457* (2019.01)

(52) U.S. Cl.
CPC ... *G05B 23/0264* (2013.01); *G06F 16/24578* (2019.01); *G05B 23/021* (2013.01); *G05B 2219/24015* (2013.01)

(58) Field of Classification Search
CPC .................................................. G05B 23/00
See application file for complete search history.

(56) References Cited

U.S. PATENT DOCUMENTS

| | | | |
|---|---|---|---|
| 6,993,686 B1* | 1/2006 | Groenendaal | G06F 11/2023 709/224 |
| 2003/0139908 A1* | 7/2003 | Wegerich | G05B 23/0254 702/183 |
| 2006/0047809 A1* | 3/2006 | Slattery | H04L 43/02 709/224 |
| 2012/0026890 A1* | 2/2012 | Banka | H04L 67/125 370/242 |
| 2015/0301882 A1* | 10/2015 | Liao | G05B 19/4184 714/47.3 |

OTHER PUBLICATIONS

"System Manual MMS 6000, Operating Manual, Shaft Vibration Monitor MMS 6110," epro GmbH, Jöbkesweg 3, D-48599 Gronau, Germany, Sep. 12, 2007.

* cited by examiner

*Primary Examiner* — Mark A Connolly
(74) *Attorney, Agent, or Firm* — Luedeka, Neely Group, P.C.; Rick Barnes (57) ABSTRACT

A process plant management system with asset health normalization and aggregation. Aspects of the system include asset monitoring components that sense operating parameters and determine the condition of assets using a number of disparate asset condition assessment methodologies based on those parameters. The system calculates normalized component health scores from the reported asset condition information and evaluates the normalized component health scores to produce an overall asset health score for each asset. The system maintains a hierarchical representation that organizes assets using physical and logical relationships. The system generates virtual health scores for parent objects in the hierarchy from the health scores of the children of each parent object.

18 Claims, 8 Drawing Sheets

PLANT PROCESS MANAGEMENT SYSTEM WITH NORMALIZED ASSET HEALTH

This application claims rights and priority on prior U.S. provisional patent application Ser. No. 62/239,972 filed 2015 Oct. 11. This invention relates to the field of asset health monitoring and analysis. More particularly, this invention relates to a system for simplifying complex health information reports.

FIELD

Introduction

Manufacturing and processing plants typically utilize many different types of machinery, often in several different locations. Unanticipated downtime due to machinery failures disrupts production. Less severe machinery problems may result in other issues, such as reduced efficiency, longer production times, higher consumable use, or increased product defects. Down time and other problems ultimately impact plant profitability.

The development of plant process management systems that are capable of collecting large amounts of data that is used to monitor process and machinery parameters has given plant personnel the ability to identify faults in the process that are attributable to individual pieces of machinery. A wide variety of asset monitoring technologies are available to detect and evaluate the condition of the machinery based on the current operating parameters. Asset monitoring technologies report the asset condition when potential problems are detected, including an indication of the severity of the potential problem. These asset monitoring technologies operate independently of each other and employ different methodologies for determining asset condition, which results in different interpretations of problem severity.

Conventional plant process management systems focus on identifying day-to-day maintenance concerns and issues with individual assets. From a diagnostic perspective, the detail provided by conventional plant process management systems is invaluable on a per machine basis, but the amount of information provided by multiple independent machine monitoring technologies may become overwhelming. Due to the inconsistent asset condition interpretations, getting an accurate picture of the overall health of the machine becomes increasing difficult for plant personnel, especially as the number of parameters monitored for each machine increases. This issue is compounded when attempting to compare the condition of multiple machines having one or more parameters indicating potential problems. When monitoring a large number of parameters on a large number of machines, a continuous stream of alerts concerning potential problems and at least one machine reported as having a severe condition requiring immediate attention is expected.

The vast amount of information and detail available, coupled with the inability of conventional plant process management systems to reconcile the overall health of the various machines, unnecessarily complicates, and potentially frustrates, maintenance prioritization, and impacts assessments based, at least in part, on information about condition of the machinery, such as budgeting for capital expenditures, lifecycle management, capacity planning, and plant or process efficiency. To avoid information overload, plant personnel may turn off alerts for certain parameters, or simply ignore them, which eliminates the benefit of monitoring the parameter in the first place. Attempting to filter out what individual plant personnel consider noise from the available data by selectively ignoring certain parameters is likely to result in the loss of important information. Instead of adding value, parameters which are routinely filtered or ignored effectively become a detriment.

What is needed, therefore, is a system that reduces issues such as those described above, at least in part.

SUMMARY

The following summary discusses various aspects of the invention described more fully in the detailed description and claimed herein. It is not intended and should not be used to limit the claimed invention to only such aspects or to require the invention to include all such aspects.

Aspects of a process plant management system with asset health normalization and aggregation include various process equipment operating within a plant environment monitored by various asset monitoring components. Each asset monitoring component generally includes one or more sensors that are associated with a particular piece of process equipment and is responsible for calculating the condition of individual assets that it monitors using the internal logic and functions of the responsible asset monitoring component.

A health normalization module is responsible calculating normalized health components from the asset condition determined by one or more responsible asset condition monitors, calculating an overall health for each asset using the normalized component health scores, and generating virtual health scores for complex assets and organizational units using the overall health scores of the underlying assets.

An asset manager monitors and diagnoses connected process equipment, and communicates status of process equipment, as reported by the asset monitoring components. In various embodiments, the asset manager configures properties, such as, but not limited to, data collection intervals, alarm limits, event triggers, data storage locations, and notification settings. The asset manager also configures and tracks the field equipment associated with the monitored process equipment, and the physical and logical relationships involving the process equipment and the associated field equipment.

The asset manager monitors and diagnoses connected process equipment, via the asset monitoring components, and communicates information about the condition of process equipment to users and to other components of the plant process management system. The asset manager optionally handles configuration of the asset monitoring components.

In various embodiments, the associations between field equipment and process equipment are organized and mapped in a hierarchical arrangement of physical assets and complex organizational units. Physical assets generally encompass the field equipment and the associated monitored process equipment and may be simple or complex. A simple physical asset does not include other physical assets. A complex physical asset is a physical asset unit composed of other physical assets. An organizational unit is logical group, or container, that defines a relationship between physical assets or another organizational unit. Examples of organizational units include, but are not limited to, locations, processes, and asset classes. Organizational units typically do not have parameters to be monitored by the plant process management system. Within the hierarchy, a parent object is a physical asset or organizational unit with one or more assets or organizational units organized underneath it. Similarly, a child object is an asset or organizational unit that belongs to another higher-level asset or organizational unit.

The plant process management system receives asset and process parameters from the asset monitoring components. When an alert condition exists for a monitored parameter, the responsible asset monitoring component calculates a severity for the alert condition, which is reported to the plant process management system with the parameter measurements. Normalized parametric health scores corresponding to each individual parameter measured by the asset monitoring components are calculated. In various embodiments, the parameter severity reported by the asset monitoring component is used to calculate the normalized parametric health score.

Normalized parametric health scores for different measurement locations on an asset are calculated using some or all of the parametric health scores obtained from sensors associated with single measurement location. One or more different approaches may be utilized to calculate a single measurement location health score. The simplest approach for calculating a health score for a single measurement location is a worst-case approach. Effectively, the worst-case approach dynamically selects a single parametric health score and discards the remaining component health scores. A more comprehensive approach taking the alarm states on multiple parameters into consideration is the adjusted worst-case approach. Other approaches for calculating single measurement location health scores include simple aggregation of the individual component health scores using a wide variety of mathematical aggregation operations, such as, but not limited to, the mean, median, or mode, across all parameters associated with the single measurement location.

Subsequently, an overall health score is calculated for each asset. Where the asset has a single parametric or measurement location health score, the health component is adopted as the asset health. For situations where the asset has multiple measurement location health scores, the is determined from the measurement location health scores using any of the approaches for generating measurement location health scores, as described above, or variations thereof. Where higher accuracy is needed or desired, health scores are computed by evaluating multiple parametric health scores across multiple measurement locations in view of various potential fault conditions through the use of a decision tree, a logic-based expert system, or a statistical model built using machine learning techniques. When an asset is only monitored by a single asset monitoring component, the asset health calculated is the overall asset health for the asset.

Because the asset health scoring operation generates an asset health for each separate asset monitoring technology, further processing is required to obtain an overall asset health that takes all available asset health information into consideration. The multiple asset health scores for a single asset determined by different asset monitoring components associated with that asset are aggregated to produce a composite asset health that becomes the overall asset health for that asset. As with the asset health scoring operation, the composite asset health may be calculated using a basic aggregation approach or a worst-case approach. An adjusted worst-case approach is also available to determine the composite asset health using weight corresponding to the priority given to a particular asset or monitoring technology. Another approach utilized by embodiments of the asset health manager in the composite asset health determination is an adjusted average health approach, which also uses weights based on asset priority.

Once overall asset health scores are available for the underlying physical assets, the asset health manager may generate a single virtual health score for any parent object for which a health score is not available in a health roll-up operation. The virtual health score is a single health score for the parent object reflecting the contributions from the overall asset health scores of the child objects underlying the parent object. The virtual health scores are calculated using any of the approaches described above in relation to the generation of composite asset health scores in the composite asset health determination operation.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

A process plant management system with asset health normalization and aggregation is described herein and illustrated in the accompanying figures. Aspects of the system include asset monitoring devices that sense operating parameters and determine the condition of assets using a number of disparate asset condition assessment methodologies based on those parameters. The system calculates normalized component health scores from the reported asset condition information and evaluates the normalized component health scores to produce an overall asset health score for each asset. The system maintains a hierarchical representation that organizes assets using physical and logical relationships. The system generates virtual health scores for parent assets in the hierarchy from the scores of the children assets of each parent asset.

Figure 1:
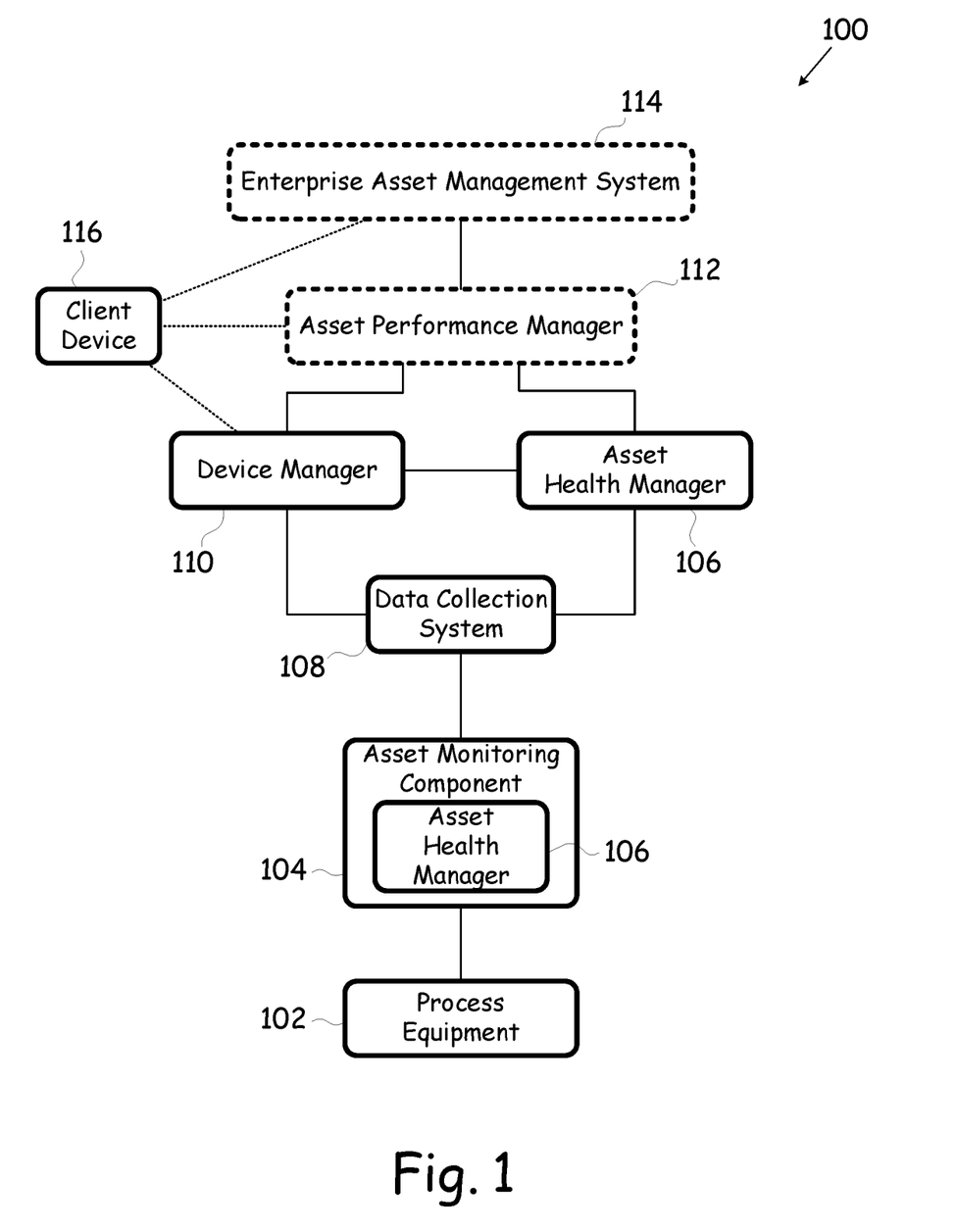
FIG. 1 is a simplified block diagram illustrating aspects of a process plant management system with asset health normalization according to an embodiment of the present invention.

FIG. 1 illustrates a simplified block diagram of a plant process management system 100 with asset health normalization and aggregation. The plant process management system 100 includes various process equipment 102 operating within a plant environment monitored by various asset monitoring devices 104.

Process equipment 102 broadly encompasses all monitorable or controllable systems and operating equipment used in a processing plant at various levels of abstraction. Process equipment includes active and passive components of a process plant. Examples of process equipment include, without limitation, systems and machinery (e.g., HVAC systems, compressors, conveyors, furnaces, boilers, chillers, and purifiers), material handling systems (e.g., vessels, piping, and ductwork) used to store and convey process materials, utility distribution and return systems that supply other process equipment (e.g., power lines, fluid supply lines, and drains), and subcomponents thereof (e.g., motors, cylinders, heating elements, pipes, reservoirs, wiring, etc.).

As used herein, the term "asset monitoring device" refers to a collection of field components and, optionally, other components of the plant process management system 100 (e.g., data collection system components) cooperating to monitor one or more parameters of the process equipment 102 and determine the condition of the process equipment 102 based on the monitored parameters. Asset monitoring devices typically focus on the use of particular monitoring technology (e.g., vibration analysis) or combination of technologies to detect potential problems with an asset.

Each asset monitoring device 104 generally includes one or more sensors that are associated with a particular piece of process equipment. Examples of suitable sensors include, but are not limited to, temperature sensors, pressure sensors, rotation sensors, accelerometers, voltage sensors, flow rate sensors, and optical sensors. Each asset monitoring device 104 outputs a measurement value that is received by a measurement status evaluation module that outputs a status based on the measurement value, such as over limit, under limit, excessive range, and so forth. The status is received by an asset health evaluation module that evaluates the status outputs based on the one or more readings taken by the monitoring device 104, and outputs a calculated health opinion or score. These health opinions for a given aspect of the equipment (vibration, temperature, pressure, etc.) are all received by a combined asset health evaluation module, which computes a combined asset health score.

Each of these modules includes a processing device capable of performing logical and mathematical operations on input data, memory for storing instructions and information used in processing the input data, and input/output interfaces for receiving signals from and sending signals to other modules in the plant process management system.

Asset monitoring devices may vary in sophistication and complexity. For example, a simple asset monitoring device for monitoring a boiler may receive signals from a temperature sensor or a pressure sensor. An asset monitoring device for monitoring process fluid clarity may receive signals from optical emitters or detectors. An asset monitoring device for monitoring vibration may receive signals from accelerometers. An asset monitoring device for monitoring compressor valve health may receive signals from a rotation sensor, accelerometers, or temperature sensors.

A data collection system 106 stores information received from the asset monitoring devices 104 and other components of the plant process management system 100. The data collection system 108 includes a controller, an input/output interface, and at least one data storage medium to store sensor data and passed from the asset monitoring component 104 for purposes such as, record keeping and trend analysis. Examples of data storage media include volatile and non-volatile memory, fixed disk drives, and removable media drives (e.g., disc or tapes) implemented in various technologies (e.g., magnetic or optical media). Embodiments of the data collection system 106 utilize data storage media implementations ranging from a single physical storage device or a logical array of storage devices. Logical arrays of storage devices may be contained in a single device (e.g., a local disk drive array) or distributed across multiple devices (e.g., cloud storage). Aspects of the data collection system 106 include short term and long term retention of sensor data for temporary use or archival and storage, storage of raw or processed sensor data, and down sampling or other data compression to reduce data storage requirements.

The plant process management system also includes one or more command and control components 108 that operate on the information received from the asset monitoring components 104. The command and control system 108 provides features and functionality, such as, system and process configuration, access control and security, asset management, and optionally, additional features and functionality, such as, but not limited to process control, alerts and reporting, performance monitoring, security, machine health monitoring, predictive analysis, maintenance forecasting, and lifecycle management.

The command and control system 108 of the illustrated plant process management system 100 includes an asset manager 110, a health normalization module 112, and optional components, such as an asset performance manager 114 for advanced analysis and reporting of asset performance or an enterprise asset management system 116 for asset management planning based on condition-based management strategies and other lifecycle management functions, such as budgeting.

The asset manager 110 monitors and diagnoses connected process equipment via the asset monitoring components 104, and communicates information about the condition of process equipment to users and to other components of the plant process management system 100. For example, the asset manager 110 manages details about the associations between field equipment and process equipment and the organizational units to which field equipment and associated process equipment are assigned. The asset manager 110 optionally handles configuration of the asset monitoring components 104 allowing users to set properties, such as, but not limited to, data collection intervals, alarm limits, event triggers, data storage locations, and notification settings (e.g., who is notified and how notifications are delivered).

In various embodiments, the associations between field equipment and process equipment are organized and mapped in a hierarchical arrangement of physical assets and organizational units. Physical assets generally encompass the field equipment and the associated monitored process equipment and may be simple or complex. A simple physical asset does not include other physical assets (e.g., a motor). A complex physical asset is a physical asset unit composed of other physical assets (e.g., a compressor that includes a motor). An organizational unit is logical group, or container, that defines a relationship between physical assets or another organizational unit. Examples of organizational units include, but are not limited to, locations, processes, and asset classes. Organizational units typically do not have parameters to be monitored by the plant process management system 100. Within the hierarchy, a parent object is a physical asset or organizational unit with one or more assets or organizational units organized underneath it. Similarly, a child object is an asset or organizational unit that belongs to another higher-level asset or organizational unit.

A health normalization module 112 is responsible for calculating an overall health for each asset using the normalized component health scores, and generating virtual health scores for complex assets and organizational units using the overall health scores of the underlying assets. In some embodiments, the health normalization module 112 also calculates normalized health components from the asset condition determined by the responsible asset condition monitor 104. The operation of the health normalization module 112 is discussed in detail hereinafter.

The health normalization module 112 includes shared core components and one or more asset type or asset monitoring technology specific interface components. The interface components provide a connection between the asset monitoring components 104 and the command and control system 108 and extend the health normalization module 112 to accommodate differing asset types or asset monitoring technologies. The health normalization module 112 connects and converts native condition health values into the normalized health values for use throughout the command and control system 108. The interface components understand the contain the native condition health values for the asset types or asset monitoring technologies they represent and contain the control logic to converts the native parameter-based condition information specific to the particular asset monitoring component into a parametric health score normalized to the standard used the plant process management system 100. The primary function of the shared core components is to combine the normalized health scores from the various interface components into a single overall health score for the asset.

In some embodiments, the controller of asset monitoring component 104 calculates the normalized parametric health scores passed to the plant process management system, which eliminates the need for an interface component for that specific asset type or asset monitoring technology. In other embodiments, the interface module is a separate component of or is incorporated into another component of the command and control system 108 (e.g., the access manager) that receives condition information from the asset monitoring component and calculates the normalized parametric health scores using logic supplied by or with the asset monitoring component. For example, in some embodiments, the logic is supplied as part of a software plugin associated with asset monitoring component and executed by the health normalization module 112 or other component of control and command system 108.

Other components of the command and control system 108, such as the optional asset performance manager 114 and enterprise asset management system 116 benefit from the normalized asset health scores and the virtual health scores for parent objects provided by the asset monitoring components 104 and the health normalization module 112 of the plant process management system 100.

Typically, each component of the command and control system 108 includes, at least, a processor and memory for storing and executing programs, an input/output interface, and communication interface and provide a user-interface 118, which encompasses applications, visual displays, audible prompts, and other communications enabling a user to receive information about and/or modify the configuration, operation, or status of the process plant via typing, touches, gestures, speech, or other human interface modalities. The components of the command and control system 108 may include appropriate human interface devices (e.g., monitors, projectors, keyboards, mice, touch screens, microphones, etc.) to provide the user interface locally. Alternatively, the user interfaces may be accessed remotely through human interface devices of a client device 122 (e.g., a desktop computer, a laptop computer, a tablet computer, or a smart phone) in communication with the command and control system 112 via a communications link 120 (e.g., a local area network, a wide area network, a cellular network, or the Internet).

The user interface(s) allow users to interact with the plant process management system to conFig. and control operation of managed assets, monitor the condition of managed assets and process parameters, plan and schedule maintenance activities, generate and view reports concerning managed assets, organizational units, processes, and other items within the purview of the plant process management system, and otherwise utilize plant process management system functionality.

Figure 2:
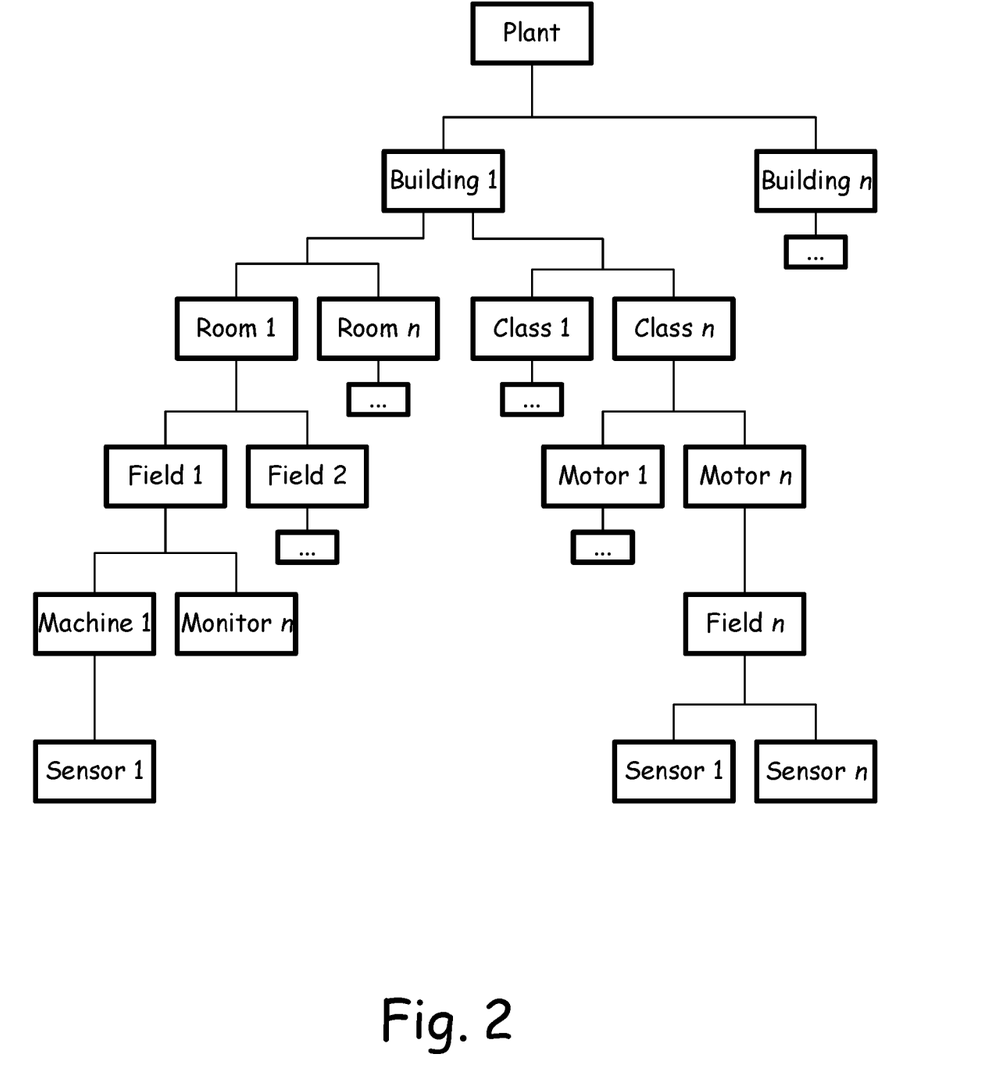
FIG. 2 is a simplified diagram of a representative hierarchical arrangement of assets monitored using the process plant management system according to an embodiment of the present invention.

FIG. 2 is a simplified diagram of a representative hierarchical arrangement of assets monitored using the process plant management system. The first level of the hierarchy 200 contains the parent object 202 under which all assets being monitored by the plant process management system are organized, directly or indirectly. Assets at the same level in the hierarchy are considered sibling assets. An asset at a level below another asset are considered child assets of the higher-level asset from which the lower-level asset depends.

The illustrated hierarchy 200 shows a multiple branch of assets arranged using different relationships. The top-most object 202 in the representative hierarchy 200 is an organizational unit representing the process plant. On a larger scale, an enterprise with multiple plants might have an organizational unit representing an entity operating the plants (e.g., Acme Corp. or widget division) or a geographic boundary (e.g., a state, country, or region) as the top-most object in the hierarchy 200.

The second tier objects 204 in branch A of the hierarchy 200 are organizational units corresponding to various buildings at the plant where physical assets are located. The third tier objects 206 in branch A of the hierarchy 200 are organizational units corresponding to areas or rooms within the various buildings allowing further refinement of the location of the physical assets. The fourth tier objects 208 in branch A in the hierarchy 200 correspond to physical assets, namely the asset monitoring components associated with process equipment located in the parent area. The fifth tier objects 210 correspond to process equipment monitored by the parent asset monitoring component. In branch A1, the lowest tier object 212 is a sensor of the asset monitoring component instrumenting the parent machine.

In branch A2, the objects 214 in the tier below the machine correspond to measurement locations. If the machine does not have discrete sub-machines to be monitored, the measurement location objects may simply be organization units indicating a location on the machine where the sensor is located (e.g., left side, housing, cylinder head, etc.). However, if the parent machine includes sub-machines, the measurement location objects may correspond to items considered to be distinct physical assets (e.g., an intake pump motor and an exhaust pump motor). Finally, the lowest tier objects 216 in branch A2 correspond to sensors of the asset monitoring component instrumenting the parent machine.

As shown, the branches in the hierarchy may have different numbers of tiers, or levels. Further, the contents of the branches may vary from level-to-level. In the illustrated hierarchy 200, branch B represents an alternate organization of where the primary organizational unit is asset class rather than physical location. In various embodiments, assets may be duplicated in various alternate organizational branches, as shown by the repetition of "Machine x" from Branch A1 in Branch B1. In various embodiments, asset health scores are specific to the asset, so multiple instances of the same asset appearing in different organizational branches of the hierarchy 200 have the same asset health score.

The assets being monitored by the plant process management system may be organized using numerous variations of the hierarchical arrangement, combinations of physical and organizational units, and levels of detail. The exemplary hierarchy should not be construed as limiting the available hierarchical arrangements, groupings, and details in any manner.

Figure 3:
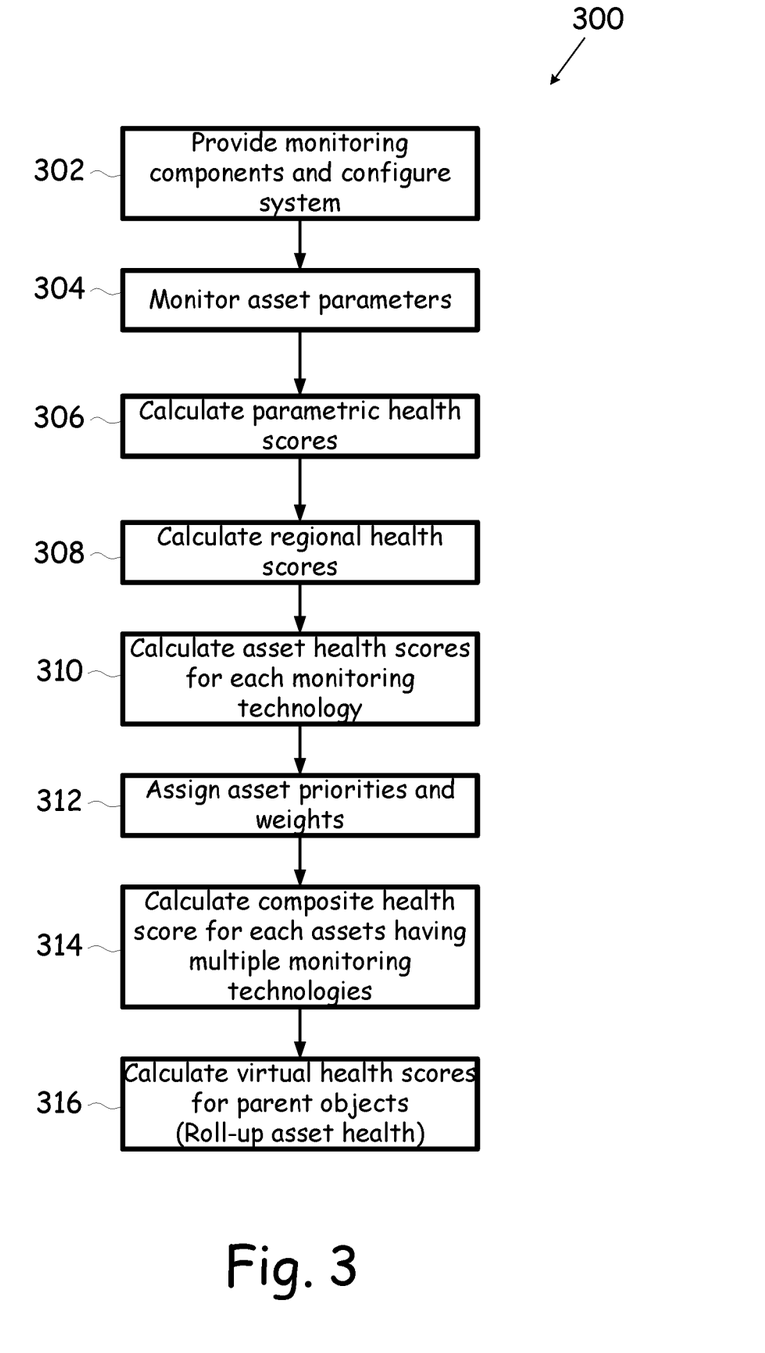
FIG. 3 is a flowchart illustrating aspects of a method of asset health monitoring performed by the process plant management system according to an embodiment of the present invention.

FIG. 3 is a flowchart illustrating aspects of a method 300 of asset health monitoring performed by the process plant management system. As a preliminary step 302, individual assets are instrumented with asset monitoring components and the assets and asset monitoring components are organized and conFig.d within the plant process management system.

In a monitoring operation 304, the plant process management system receives asset and process parameters from the asset monitoring components. The parameter data is collected and analyzed by the plant process management system to detect operating conditions that fall outside of specifications and identify trends. For example, basic analysis performed by the plant process management system involves comparing parameter data to threshold values and generating alerts when the measured parameters cross a threshold. Such thresholds may be conFig.d during the preliminary step 302. When an alert condition exists, the responsible asset monitoring component calculates a severity for the alert condition, which is reported to the plant process management system with the parameter measurements.

In a parametric health score scoring operation 306, the plant process management system calculates parametric component heath scores for each asset. The plant process management system expresses each component health score as a value within a selected range of values. In various embodiments, asset health is expressed as a number between 0 and 100, with a value of 100 representing an asset in perfect condition and fully operational and a value of 0 representing an asset that is broken or needs immediate maintenance. One or more different types of component health scores may be depending upon the class of asset and other factors. Among the available types of component health scores are parametric health scores and measurement location health scores.

Parametric health scores are health scores corresponding to each individual parameter measured for the asset (e.g., temperature, vibration, oil pressure) by the asset monitoring components. In various embodiments, the parameter severity reported by the asset monitoring component is used to calculate the parametric health score. For example, when an asset parameter exceeds a critical level, the responsible asset monitoring component assigns a high severity value based on its internal severity analysis functions and logic. As previously mentioned, high severity corresponds to low asset health. In a preferred embodiment, the health normalization module calculates asset health by subtracting a severity value associated with a fault from a reference value. The reference value is selected based on the range of severity values to produce an asset health in a desired range. For example, if severity values range from 0 to 100, with 100 being the most severe, subtracting the severity value from a reference value of 100 produces an asset health ranging from 0 to 100. Calculation of asset health is not limited to subtraction or any particular mathematical operation or scale.

When necessary, consolidation of separate parametric health scores for the same parameter obtained by different sensors on an asset wide basis is accomplished by selecting the lowest value (i.e., worst case) or aggregating the values (e.g., averaging).

In a measurement location health scoring operation 308, the health normalization module calculates a health score for each measurement location (e.g., the left side or the cylinder head) using some or all of the parametric health scores obtained from sensors associated with the measurement location, as configured in the organizational hierarchy. The health normalization module may utilize one or more different approaches to calculate a single measurement location health score. The simplest approach for calculating a single measurement location health score is a worst-case approach. When applying the worst-case approach, the health normalization module adopts the lowest parametric health score from the measurement location as the health score for that measurement location. Effectively, the worst-case approach dynamically selects a single parametric health score and discards the remaining component health scores. While it is possible for the measurement location health score to be somewhat pessimistic when one parametric health score in a measurement location is significantly lower than the rest, the worst-case approach still provides a reliable measure of measurement location health because each parameter generally represents an aspect of the asset being monitored (e.g., bearing fault, unbalance, misalignment, etc.) and the greatest risk of failure is likely to be tied to the most severe alert condition.

However, an asset experiencing alarm states on multiple parameters is generally in worse health than an asset experiencing an alarm state on a single parameter. A more comprehensive approach taking this into consideration is the adjusted worst-case approach. The adjusted worst-case approach begins with the lowest individual parametric health score and reduces that score based on aggregations of the other individual parametric health scores to obtain the single measurement location health score. In the preferred embodiment, the single measurement location health score is never reduced below the minimum value in the selected range of values (e.g., never below 0 in when asset health ranges between 0 and 100). In some embodiments, the lowest individual parametric health score is reduced by the mean, median, mode, or other mathematical aggregation of the severity or health degradation (as opposed to the asset health) of the remaining individual parameters. The aggregated value of the remaining individual parameters scores may be weighted or otherwise modified to scale the impact. Similarly, some embodiments of the health normalization module reduce the lowest individual parametric health scores by a weighted aggregation of remaining individual component health scores to discount the duplication in health loss (e.g., subtracting 50% of the aggregated component health scores). Alternatively, the health normalization module may employ techniques such as scaling, weighting, or data binning to each of the remaining individual parametric health scores and reducing the lowest individual parametric health score health by the resulting individual values.

Other approaches for calculating measurement location health scores include simple aggregation of the individual component health scores using a wide variety of mathematical aggregation operations, such as, but not limited to, the mean, median, or mode, across all parameters for the measurement location.

In an asset health scoring operation 310, the health normalization module computes a health score for each asset and a single asset monitoring component. Where the asset has a single parametric or measurement location health score, the health normalization module simply adopts that health component as the asset health. In cases where the asset has multiple different parametric health scores, but no measurement location health scores, the health normalization module computes the asset health by selecting the lowest value (i.e., worst case) or aggregating the values (e.g., averaging).

The following examples illustrate the differences between some of the alternative approaches used to calculate asset health from multiple measurement location health scores. Consider a scenario where the measurement location health scores are 52, 95, and 93 for a first asset and 60, 62, and 65 for a second asset. Under the worst-case approach, the resulting asset health scores are 52 for the first asset and 60 for the second asset. Under the adjusted worst-case approach (using the average), the average severity of the remaining measurement location health scores is 6 for the first asset and 36.5 for the second asset, which gives asset health scores of 46 for the first asset and 23.5 for the second asset. Thus, the basic worst-case approach suggests that first asset is in slightly worse condition than the second asset, while adjusted worst-case approach suggests that the second asset is in much greater need of repair than the first asset. In both cases, the adjusted worst-case approach produces lower asset health scores than the worst-case approach, and the wide swing in asset health scores for the second asset illustrates the significance that declining health in multiple areas has on the overall asset health under the adjusted worst-case approach.

The basic aggregation approaches would produce measurement location health scores of 79.3 for the first asset and 62.3 for the second asset using the mean and 93 the first asset and 62 for the second asset using the median. In contrast to both of the worst case approaches, the basic aggregation approaches are more optimistic about the asset health. And, like the adjusted worst-case approach, the aggregation approaches suggest the second asset is in worse shape the first asset when all measurement location health scores contribute to the overall asset health determination.

For situations where the asset has multiple measurement location health scores, the health normalization module determines the asset health from the location health scores using any of the approaches for generating the measurement location health scores, as described above.

Rather than calculating and then rolling-up the measurement location health scores, an alternative approach is to calculating the asset health directly from the parametric health scores for the entire asset at one time using any of the approaches for generating the measurement location health scores, as described above. If the measurement location health scores are not desired or required by other components of the plant process management system, the health scoring operation 308 may be omitted when using this approach.

While each of the approaches discussed above are valid and produce reasonably accurate health scores suitable for most plant process management objectives under a wide range of scenarios, each approach involves compromises that potentially reduces the accuracy of asset health determinations. Where higher accuracy is needed or desired, embodiments of the health normalization module compute health scores by evaluating multiple parametric health scores across multiple measurement locations in view of various potential fault conditions through the use of a decision tree, a logic-based expert system, or a statistical model built using machine learning techniques.

When an asset is only monitored by a single asset monitoring component, the asset health calculated in the asset health scoring operation 310 is the overall asset health for the asset. However, because the asset health scoring operation 310 generates an asset health for each separate asset monitoring technology, further processing is required to obtain an overall asset health that takes all available asset health information into consideration. Discussion of the additional processing begins with a priority assignment operation 312.

In the priority assignment operation 312, assets are optionally assigned a priority that reflects the significance of the asset in a determination of an overall asset health or virtual health. In the context of an asset monitoring component, the asset priority reflects the significance of the monitoring technology employed by the asset monitoring component relative to other monitoring technologies. Asset priority is expressed as value from a set or value falling within a range. In a preferred embodiment, the plant process management system expresses asset priority as a number between 0 and 4, where 0 is an unknown priority, 1 is low priority, 2 is medium priority, 3 is high priority, and 4 is very high priority. The preferred embodiment should not be considered limiting as other embodiments can have different numbers of levels and use different values and descriptors to represent asset priority.

Default weights used when aggregating (i.e., rolling-up) health scores into a single overall health score or virtual health score are also assigned during the priority assignment operation 308. Each asset priority is assigned a default weight. In various embodiments, the weights used by the health normalization module range from 0 to 1. In the preferred embodiment, the default weights are 0.5 for an unknown priority, 0.25 for low priority, 0.5 for medium priority, 0.75 for high priority, and 1.0 for very high priority. The weight signifies the importance of the asset health for a particular technology or process relative to other technologies or processes. For example the health calculated by vibration analysis asset monitoring component may be deemed more relevant than oil analysis asset monitoring component. In such a case, a user may assign a higher priority to the vibration analysis asset than the oil analysis asset such that the vibration-analysis based parametric health score will have a greater contribution to the overall health of the asset or rolled-up into a virtual score for a parent object than the oil-analysis based parametric health score.

Both the asset priorities and the weights may be modified by a user when configuring the plant process management system in the preliminary step 302. It should be appreciated that other weighting schemes may be used without departing from the scope and spirit of the present invention.

In a composite asset health determination operation 314, multiple asset health scores for a single asset determined by different asset monitoring components associated with that asset are aggregated to produce a composite asset health that becomes the overall asset health for that asset. As with the asset health scoring operation 310, the composite asset health may be calculated using a basic aggregation approach or a worst-case approach. In a preferred embodiment of the basic aggregation approach, the composite asset health is the mean of the asset health scores from all contributing asset monitoring components. The worst-case approach adopts the lowest asset health score from all contributing asset monitoring components as the composite asset health.

An adjusted worst-case approach is also available to determine the composite asset health, but the implementation is different. The adjusted worst-case approach involves calculating a weight factor equal to the product of the health degradation (i.e., the maximum health scale value minus the asset health) and the asset weight and an adjusted health score equal to the maximum health scale value minus the weight factor. The composite asset health under the adjusted worst-case approach is the minimum adjusted health score.

Another approach utilized by embodiments of the health normalization module in the composite asset health determination is an adjusted average health approach. The adjusted average health approach utilizes the same weight factor as the adjusted worst-case approach. The composite asset health under the adjusted worst-case approach is calculated as the maximum health scale value minus the quotient of the mean of the weight factors divided by the mean of the weights.

Once overall asset health scores are available for the underlying physical assets, the health normalization module may generate a single virtual health score for any parent object for which a health score is not available in a health roll-up operation 316. The virtual health score is a single health score for the parent object reflecting the contributions from the overall asset health scores of the child objects underlying the parent object. The virtual health scores are calculated using any of the approaches described above in relation to the generation of composite asset health scores in the composite asset health determination operation 314.

In particular, virtual health scores are useful to provide a mechanism for visualizing a summary of the overall health of multiple physical elements logically grouped together. For example, referring back to the representative hierarchy shown in FIG. 2, the overall health of all monitored process equipment can be summarized by rolling up the overall asset health values to the top-level plant object. Similarly, the overall health of a selected class of process equipment (e.g., motors) in Building 1 can be summarized by rolling up the overall asset health values to the appropriate class object organized under the "Building 1" object. The use of virtual health scores is not limited to organizational units. Virtual health scores may be generated for any complex asset, including a complex physical asset that is not separately instrumented and monitored by any asset monitoring component.

A plant process management system with asset health normalization and aggregation has been shown and described. Summarizing the overall asset health in a single normalized value with contributions from all available asset condition information provides users with a simple and meaningful visualization of the current condition of the asset. The overall asset health score allows the process plant management system to alert users to potential problems with an asset detected by any monitoring technology while reducing resource usage (e.g., bandwidth and storage requirements) as a result of generating alerts based on a single overall health score rather than multiple individual parameters. Additionally, generating a single normalized overall asset health values for each asset allows direct comparison of the relative health of different assets monitored using different monitoring technologies. As a result, the accuracy and efficiency of process plant management activities based on relative asset health, such as maintenance prioritization, whether automated by the process plant management system or manually conducted based on information provided by process plant management system is increased. Finally, the generation of virtual health scores for organizational units based on the actual health scores of the underlying assets allows the plant process management system to provide visualizations that convey an accurate assessment of the overall health of physical assets.

Figure 4:
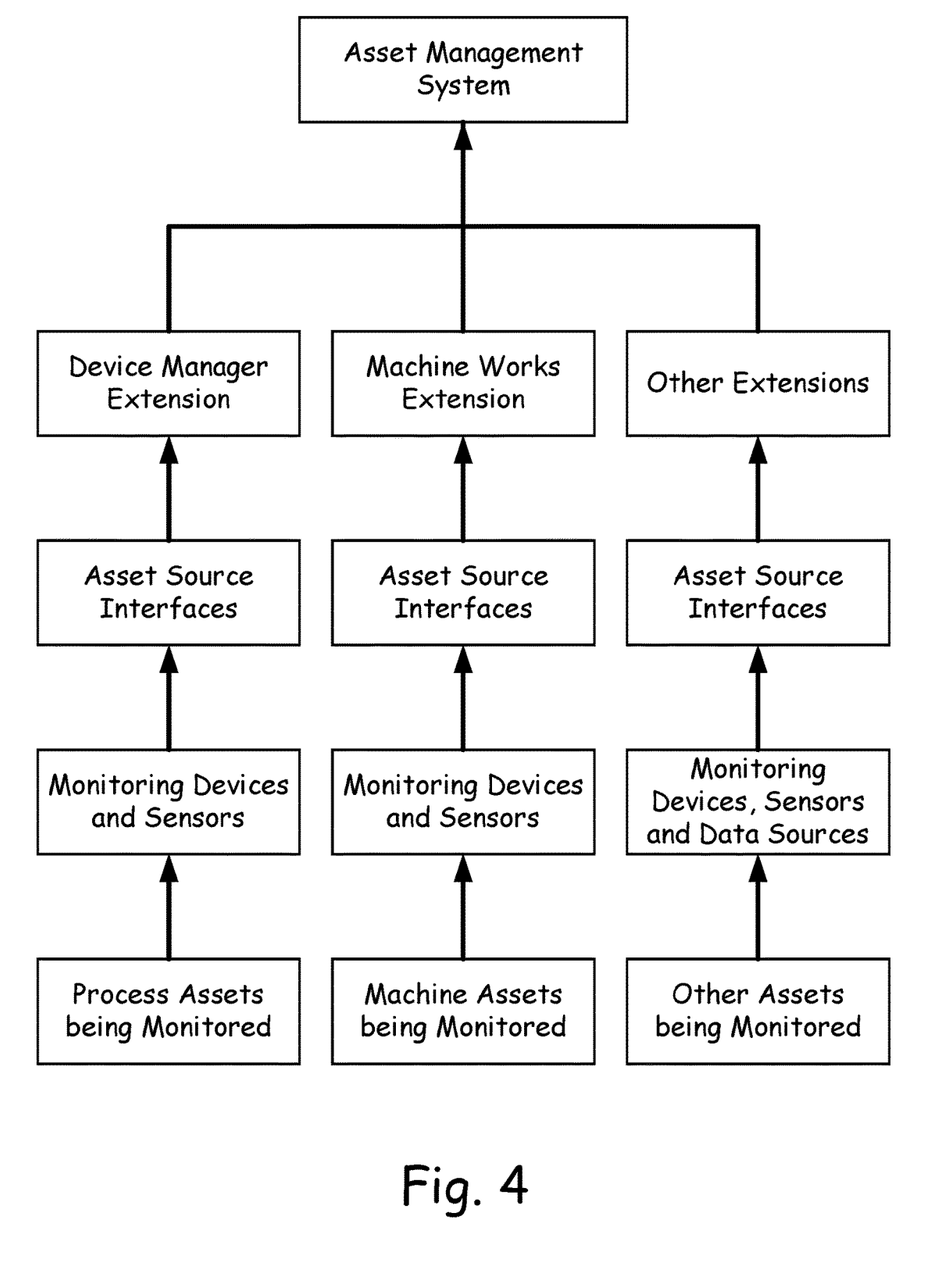
FIG. 4 is an alternate simplified diagram of a representative hierarchical arrangement of assets monitored using the asset management system according to an embodiment of the present invention.

With reference now to FIG. 4 there is given a depiction of an embodiment of the hierarchical system for monitoring and retrieving data in regard to process assets (in the left-hand column), machine assets (in the middle column), and other assets (in the right-hand column). As given on the bottom-most row, there are representations of the actual assets being monitored. In the next row up are representations of the devices and sensors that monitor the assets represented on the bottom row, and the data that flows from assets to the monitoring devices and sensor. The data from the monitoring devices and sensors flows upward to the asset source interfaces tier, and from there to the associated extension, whether it be the device manager extension, the machine works extension, or other extension. From there the data is delivered in a desired protocol to the asset management system as described elsewhere herein.

Figure 5:
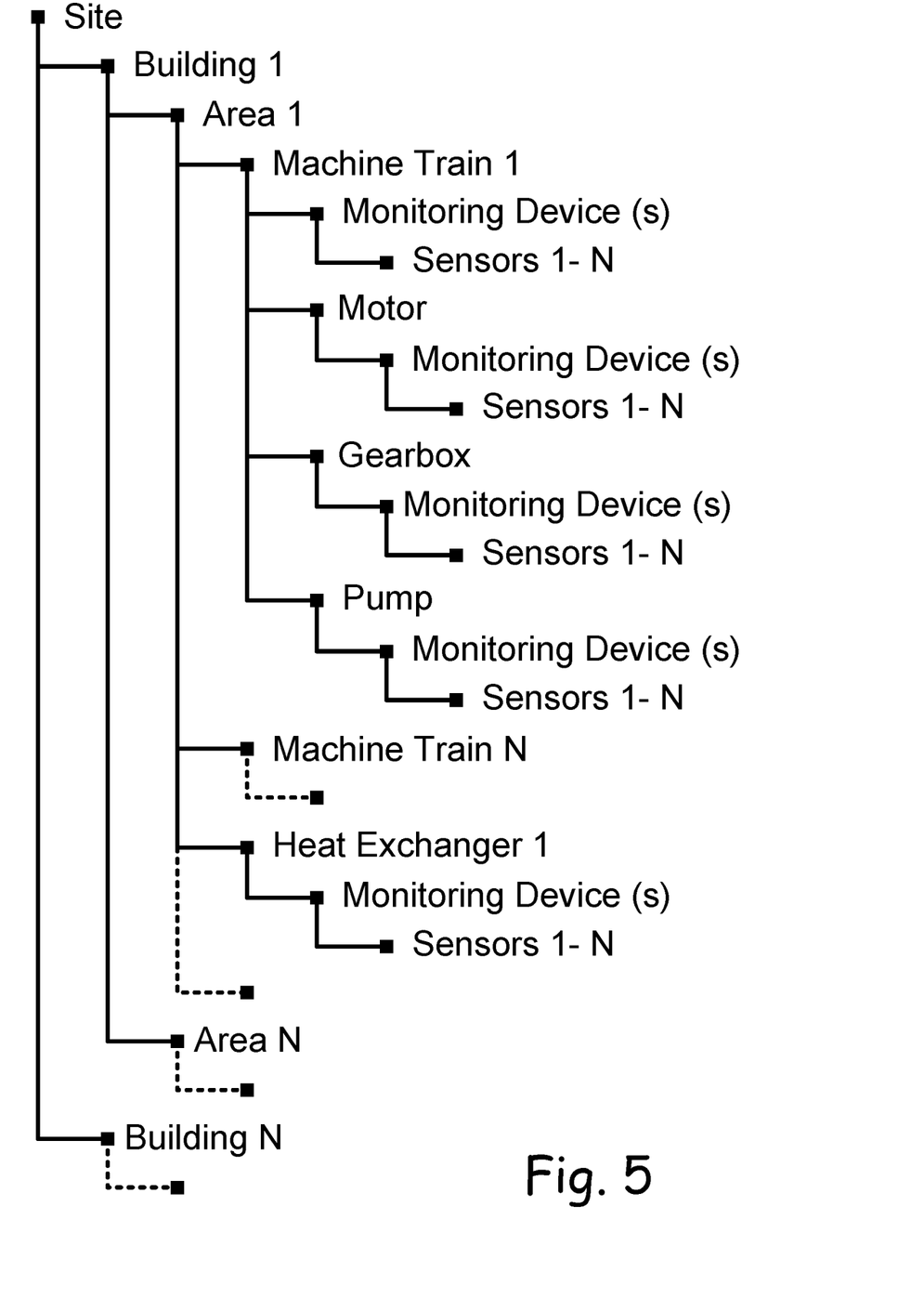
FIG. 5 depicts a hierarchical view of locations, assets, devices, and sensor according to an embodiment of the present invention.

FIG. 5 depicts another embodiment of the hierarchical nature of the system. In the embodiment of FIG. 5, the top-most level is a given asset site, such as might be designated by a campus, city, state, country, or world-wide. Within the site are various installations, which in the example depicted in FIG. 5 are recited as buildings. Within each building there may be listed different area, such as different process areas, different manufacturing lines, different departments, and so forth. Within each area are located different assets, such as machines or other equipment, such as the heat exchanger 1 as depicted. Also as depicted, a given machine, or machine train, can have multiple sub components that are each individually monitored, such as the motor, gearbox, and pump as depicted in FIG. 5. For each component there are one or monitoring devices, each having one or more sensors. In this manner, what could otherwise be an overwhelming number of sensors—which produce an overwhelming amount of data—is placed into a hierarchical structure and readily identified. It is appreciated that more or fewer hierarchical layers than that as depicted are contemplated.

Figure 6:
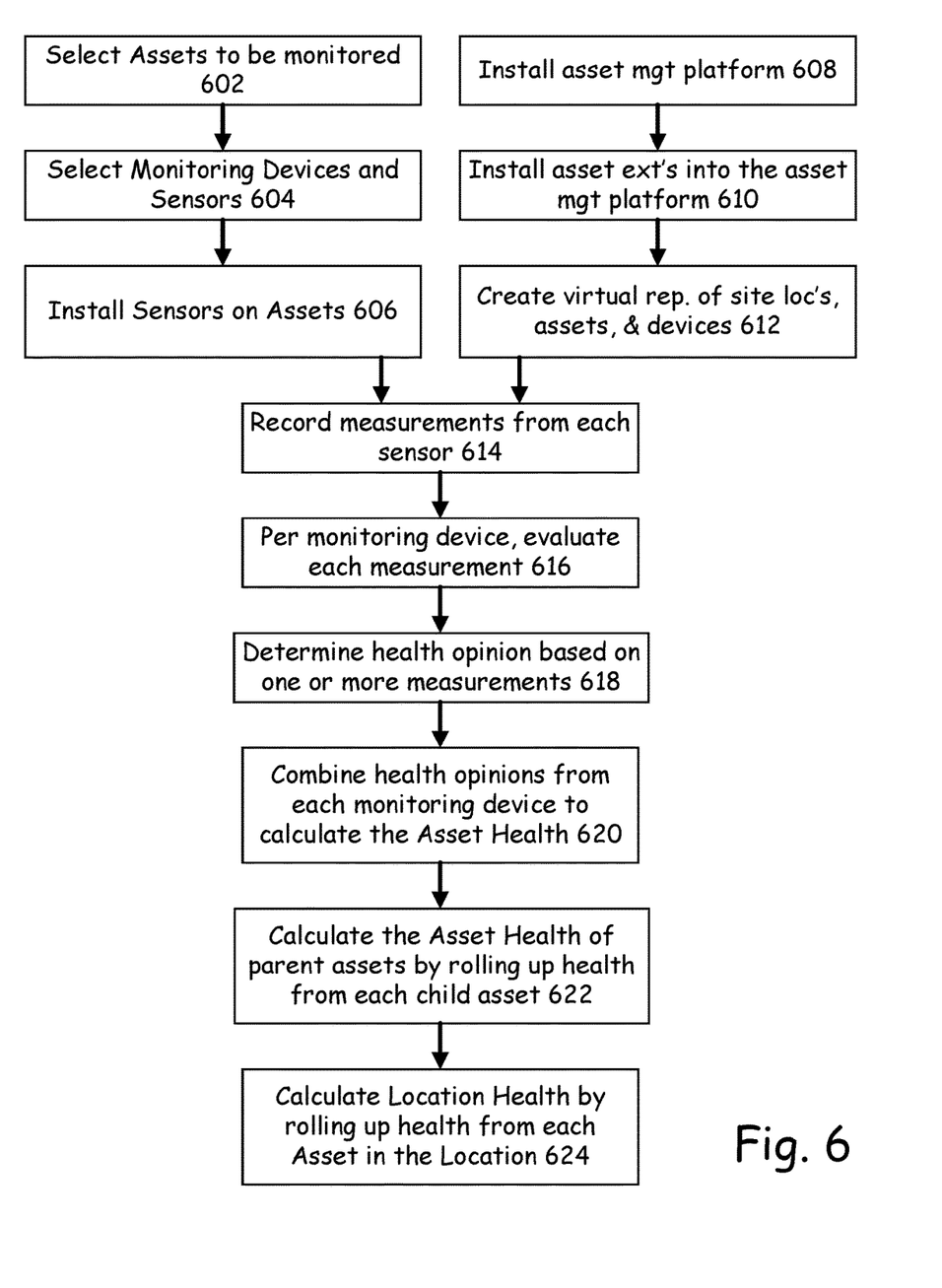
FIG. 6 is a flowchart illustrating aspects of a method of asset health monitoring performed by the asset management system according to another embodiment of the present invention.

FIG. 6 depicts an overall method by which the system is set up and operates. The assets to be monitored are selected, as given in block 602, and appropriate monitoring devices and sensors are selected as given in block 604. The sensors are then installed on the assets, as given in block 606. Either before, during, or after that process the asset management platform software is installed on appropriate computing systems, as described above, and as given in block 608. The appropriate asset extensions are then installed into the asset management platform, as given in block 610, which extensions are associated with the assets that were selected for monitoring, as given in block 602. A virtual representation of the site locations, assets, and devices, as described in regard to FIG. 5, is then built within the asset management platform, as given in block 612, as a virtual model of the locations, assets, and devices.

Once those steps have been completed, the system is brought on line, and measurements are recorded from the sensors, as given in block 614. These measurements are evaluated by the monitoring devices that receive sensory data from the sensors, as given in block 616. These evaluations are used to determine a health opinion, as given in block 616, such as by comparing the sensor data to predetermined set points and limits, or by statistically analyzing the sensor data as it is received. The health opinion, and the opinions derived from it as described below, can take many different forms, such as a numerical value, an alphabetical designation, a previously defined categorical binning, or a color gradient. The opinions are predominantly referred to as values below, but these other options are also contemplated.

These health opinions, based on one or more sensors or one or more monitoring devices, are combined for a given asset to calculate a value that represents the overall health of the asset, as given in block 620. These health values are then further rolled up for sub assets to determine the overall health of a parent asset to which the sub assets belong, as given in block 622. This roll up process is continued until the health of each penultimate parent asset has been computed, at which point those health values are used to compute the health of the entire location at which the assets are disposed. As described elsewhere herein, different methods may be used to combine the health values at the different level as described above.

Figure 7:
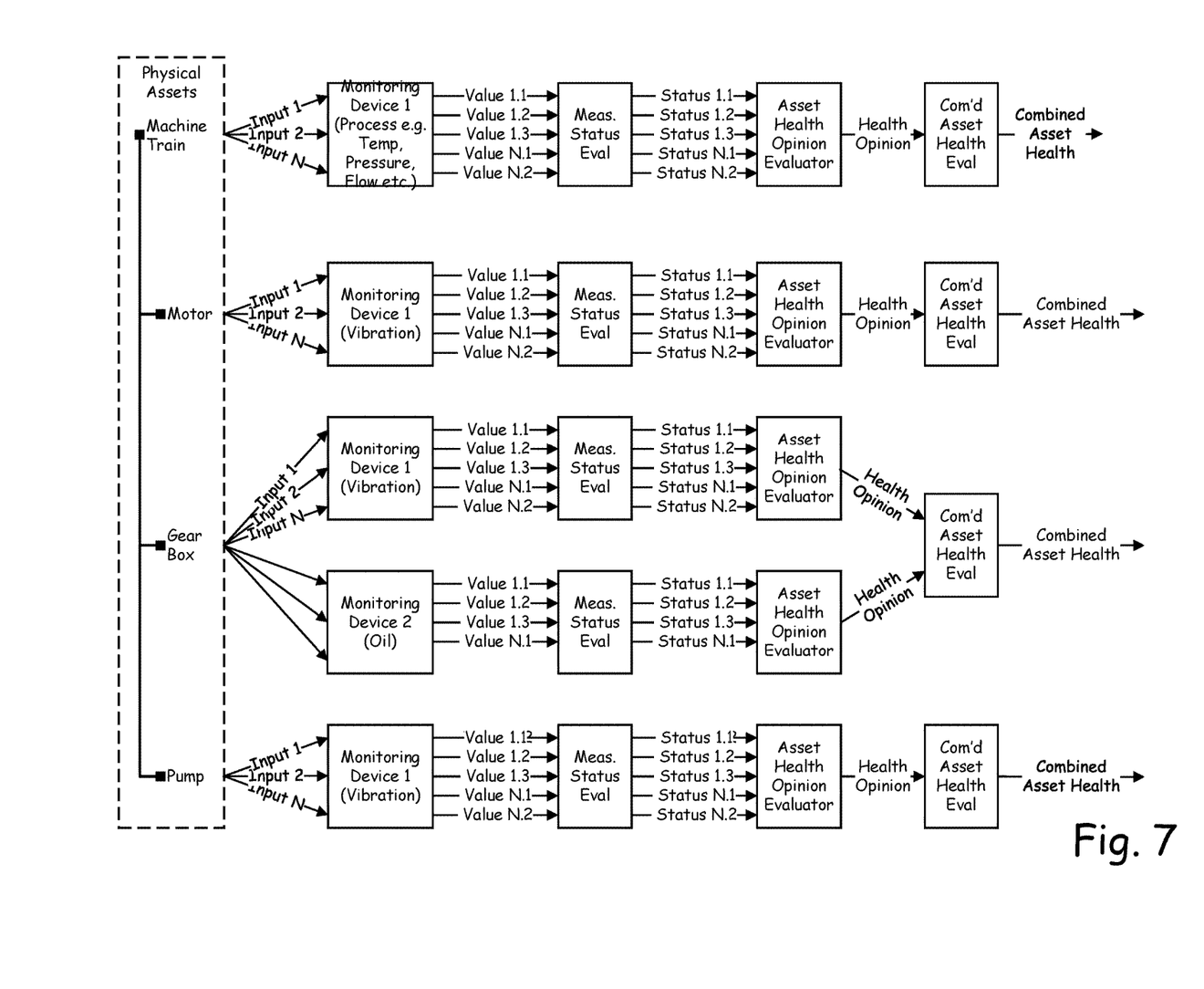
FIG. 7 is a first portion of a flowchart illustrating aspects of a method of asset health roll up performed by the asset management system according to an embodiment of the present invention.

FIGS. 7 and 8 depict another visualization of this roll up process, starting with the physical assets on the left-hand side of FIG. 7, and ending with the virtualized assets (as described above) in FIG. 8, which represent the physical assets within the virtualized asset management system.

As depicted in FIG. 7, the physical assets are represented by a machine train, but may consist of any asset within a plant, including the monitoring devices themselves. Assets could also include, for example, motors, pumps, gearboxes, vibration monitoring devices, heat exchangers, valves, pressure devices, temperature devices, flow devices, and so forth.

Each physical asset has sensors associated with it, which produce the inputs that lead from the physical asset to an associated monitoring device. In some embodiments, the monitoring devices are specific to a certain sensed property, such as process properties such as temperature, pressure, or flow, vibration, oil properties, and so forth. As depicted, more than one monitoring device can be used for similar properties of the assets, such as on different components of the physical assets, or otherwise.

In some embodiments, there are a wide range of monitoring devices, ranging from simple single measurement values—such as temperature and pressure—to complex vibration devices that have inputs from multiple sensors, each of which produce multiple measurement values. In some embodiments there are no sensors on the asset being monitored, such as in oil analysis, where an oil sample is taken from the asset and sent off to a lab for analysis on the monitoring device, which device then provides multiple measurement values. These measurement values are then depicted in FIG. 7 as the output of the monitoring devices, and are received by the measurement status evaluators.

The measurement status evaluators use pre-set, user-configurable, or statistically derived alarm limits to evaluate the alarm status of each measurement value that they receive. There are several types of alarm evaluation algorithms, such as, for example, upper limits, lower limits, and band limits. The status evaluators may be an integral part of the monitoring device firmware, or external to the monitoring device, such as in a computer processing system. The measurement status evaluators produce measurement statuses, as depicted in FIG. 7.

The measurement status messages are received by asset health opinion evaluators, as depicted in FIG. 7. The asset health opinion evaluators use algorithms to combine the measurement value statuses to derive a calculated opinion value on the health of the asset, based on the particular monitoring devices technology in the given horizontal chain (as depicted in FIG. 7), such as vibration or oil analysis. These algorithms can as simple as using the worst status received, the average of the statuses received, or some other logic to derive an overall health opinion of that aspect of the physical asset. That health value is then delivered to a combined asset health evaluator, as depicted in FIG. 7.

The combined asset health evaluator uses algorithms to create a single health value from the opinion of the various monitoring devices or technologies. In some embodiments the user weights the relative importance of these various technologies, as the opinions are combined. For example, the health opinion of the vibration technology may be rated as a higher importance than that of the oil analysis, in the evaluation of the overall health of the asset.

Figure 8:
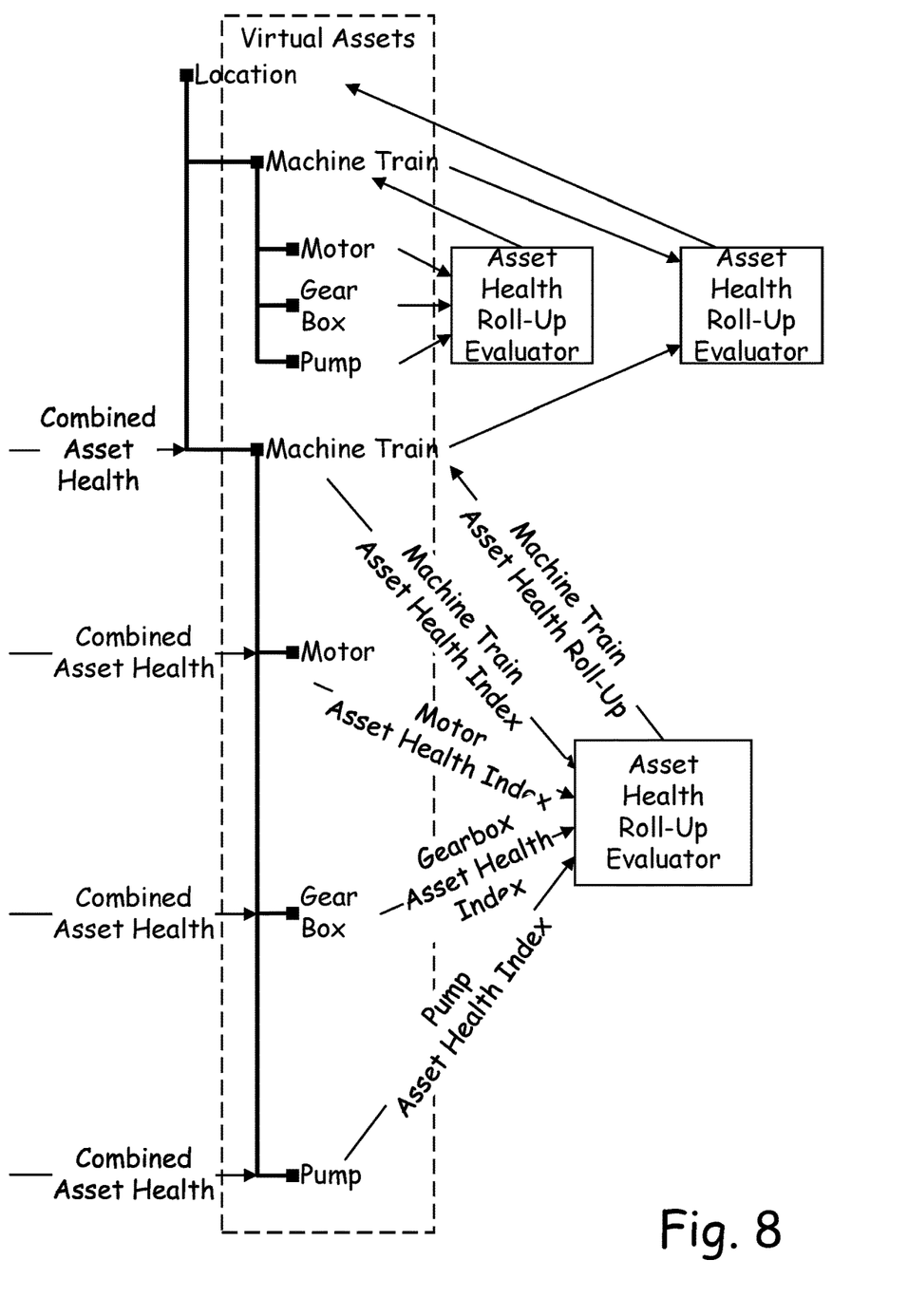
FIG. 8 is a second portion of the flowchart illustrating aspects of a method of asset health roll up performed by the asset management system according to an embodiment of the present invention.

These combined asset health values are then output to the asset model, as depicted in FIG. 8. As can be seen in FIG. 8, an asset health value is input for each virtual asset in the model. As previously described, these assets are modelled in a hierarchical arrangement. Thus, the asset health values for each asset can be rolled up into the next higher asset, using programming functionality that is designated as the asset health roll up evaluator. This software module takes into account various weighting for each of the individual asset health scores that are used in the roll-up, to produce a single health value for the asset that is next higher in the hierarchical order.

Again, various methods could be used for this roll up and any of the other combined opinions as described above, as mentioned elsewhere herein, such as highest score, lowest score, average score, weighted average score, mean score, low threshold score, high threshold score, statistically computed score, weighted worst health, weighted average health, band pass score, and so forth. Further, each asset may be assigned a weight depending on its perceived importance from the parent asset's point of view.

The parent machine train may also be independently monitored, and will thus receive a health value directly. In this case the overall health of the parent asset can be determined by the combination of the rolled up health of its child assets and the result of the health determined by its monitoring devices, for example.

In this manner, a method and system are provided for quickly distilling the health of a complex facility to a single number or other grade that is representative of the overall condition of the facility. However, also available is the ability to drill down to find out the health of individual assets within the facility, and individual components within the assets, and different parameters of the components, so that a greater understanding of the true condition of the facility can be developed.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An apparatus for evaluating health for a plurality of assets in a plant process management system, the apparatus comprising:
   a. an asset manager implemented as software running on a processor, and organizing the plurality of assets into a hierarchical arrangement of parent objects and child objects;
   b. a plurality of asset monitoring components, each asset monitoring component comprising a sensor operatively connected to one of the assets, each asset monitoring component determining a condition value for the asset based on a parameter measured using the sensor,
   c. a health normalization module implemented as software running on a processor, and calculating parametric health scores based on the asset condition values determined by the asset monitoring components, the parametric health scores normalized to a selected range of values, and
   d. a user interface allowing selection of a parent object from the hierarchy,
   e. wherein the asset manager:
      i. computes a normalized asset health score for each child object underlying the parent object that is monitored by one of the asset monitoring components based on the normalized parametric health scores received from the connected asset monitoring component,
      ii. computes a virtual health score as the normalized asset health score for each child object underlying the parent object from the normalized asset health score of each child object underlying the unmonitored parent object;
      iii. computes a virtual health score for the selected parent object from the normalized asset health score of each child object depending from the selected parent object; and
      iv. displays a visualization of the virtual health score for the parent object via the user interface.

2. The apparatus of claim 1:
   a. wherein the plurality of asset monitoring components comprises:
   b. a first asset monitoring component comprising a sensor operatively connected to a first asset and used to measure a condition value of the first asset, the first asset condition value measured on a first scale; and
   c. a second asset monitoring component comprising a sensor operatively connected to a second asset and used to measure a condition value of the second asset, the second asset condition value measured on a second scale; and
   d. wherein the health normalization module calculates a first normalized parametric health score for the first asset based on the first asset condition value and a second normalized parametric health score for the first asset based on the second asset condition value.

3. The apparatus of claim 1 wherein the plurality of asset monitoring components includes a first asset monitoring component comprising:
   a. at least one sensor operatively connected to a first asset in a first measurement location, each sensor measuring a condition value for the first measurement location; and
   b. at least one sensor operatively connected to the first asset in a second measurement location, each sensor measure a condition value for the second measurement location.

4. The apparatus of claim 3 wherein the health normalization module calculates normalized parametric health scores corresponding to the measured condition values, the health normalization module calculating a first measurement location health score from the normalized parametric health scores corresponding to the measured condition values for the first measurement location and a second measurement location health score from the normalized parametric health scores corresponding to the measured condition values for the second measurement location.

5. The apparatus of claim 3 wherein the health normalization module calculates an overall asset health score from the normalized parametric health scores corresponding to the measured condition values for the first and second measurement locations.

6. The apparatus of claim 5 wherein the overall asset health score is one of the lowest measured condition value for the first and second measurement locations and the average of the measured condition values for the first and second measurement locations.

7. The apparatus of claim 5 wherein the overall asset health score is the lowest measured condition value for the first and second measurement locations reduced by the average of the remaining measured condition values for the first and second measurement locations.

8. A method of evaluating health for a plurality of assets in a plant process management system having a plurality of asset monitoring components, each asset monitoring component operatively connected to one of the assets, sensing a parameter associated with the asset, and determining a native health value for the asset based on the sensed parameter, the method comprising the acts of:
   a. receiving native health values from the plurality of asset monitoring components;
   b. computing parametric health scores based on the native health values, the parametric health scores being normalized to a selected range;
   c. computing a measurement location health score for each measurement location of a selected asset from the parametric health scores associated with sensors of an asset monitoring component that are located in the same measurement location of the selected asset;
   d. computing an asset health score for the selected asset based on a group of measurement location health scores for the selected asset associated with the same asset monitoring component; and
   e. adopting the asset health score as an overall asset health score for the asset when the selected asset is monitored by a single asset monitoring component.

9. The method of claim 8 wherein the act of computing a measurement location health score further comprises the act of computing the measurement location health score for a selected measurement location of the asset by one of calculating the average or the median of the parametric health scores associated with the selected measurement location or selecting as the lowest parametric health score associated with the selected measurement location.

10. The method of claim 8 wherein the act of computing a measurement location health score further comprises the act of computing the measurement location health score for a selected measurement location by reducing the lowest parametric health score associated with the selected measurement location by one of the average and the median of a normalized severity value corresponding with the other parametric health scores associated with the selected measurement location.

11. The method of claim 8 wherein the act of computing an asset health score for the selected asset based on the group of measurement location health scores for the selected asset associated with the same asset monitoring component further comprises the act of reducing the lowest measurement location health score in the group by a weighted average of the remaining measurement location health scores in the group.

12. The method of claim 8 wherein the act of computing an asset health score for the selected asset based on the group of measurement location health scores for the selected asset associated with the same asset monitoring component further comprises the acts of:
   a. associating a weight with each asset monitoring component contributing to a measurement location health score;
   b. applying the weight associated with the asset monitoring component that produced the measurement location health score to the difference between the maximum value of the selected range and each measurement location health score for a selected asset to produce a set of weight factors associated with the selected asset;
   c. dividing an average of the weight factors by an average of the weights associated with the selected asset; and
   d. subtracting the quotient from the maximum value of the selected range to produce the asset health score.

13. The method of claim 8 wherein the act of computing an asset health score for the selected asset based on the group of measurement location health scores for the selected asset associated with the same asset monitoring component further comprises the acts of:
   a. associating a weight with each parameter contributing to a measurement location health score;
   b. applying the weight associated with the parameter on which the measurement location health score is based to the difference between the maximum value of the selected range and each measurement location health score in the group to produce a set of weight factors;
   c. subtracting each weight factor from the maximum value of the selected range to produce a set of adjusted measurement location health scores for the selected asset; and
   d. selecting the minimum adjusted measurement location health score as the overall asset health score.

14. The method of claim 8 further comprising the act of organizing the plurality of assets into a hierarchical arrangement of child objects and parent objects.

15. The method of claim 14 further comprising the act of generating a virtual health score for a selected parent object by calculating an average of the asset health scores for each child object of the selected parent object or selecting the minimum asset health score from the asset health scores for the child objects of the selected parent object.

16. The method of claim 14 further comprising the acts of:
   a. associating a weight with each asset;
   b. applying the associated weight to the difference between the maximum value of the consistent scale and the overall asset health score of each child asset of a selected parent asset to produce a set of weight factors;
   c. dividing an average of the weight factors by an average of the weights; and
   d. subtracting the quotient from the maximum value of the consistent scale to produce a virtual health score for the selected parent asset.

17. The method of claim 8 further comprising the act of generating a virtual health score for a selected parent object from the overall asset health scores for each child object of the selected parent object.

18. The method of claim 17 wherein the act of combining the overall asset health scores for each child asset of a selected parent object to produce a comprehensive health score for the selected parent object further comprises the act of calculating the comprehensive health score as one of an average of the overall asset health scores for the each child asset of the selected parent object or the minimum overall asset health score out of the overall asset health scores for the child assets of the selected parent object.

* * * * *